United States Patent [19]

Lipshield et al.

[11] 4,270,406
[45] Jun. 2, 1981

[54] BRAKE CABLE OPERATING MEANS AFFORDING A MECHANICAL ADVANTAGE

[75] Inventors: Eugene C. Lipshield; Billy G. Boyer, both of Moberly, Mo.

[73] Assignee: Orscheln Co., Moberly, Mo.

[21] Appl. No.: 3,132

[22] Filed: Jan. 15, 1979

[51] Int. Cl.³ .......................... G05G 1/04; G05G 5/06
[52] U.S. Cl. .......................................... 74/516; 74/529
[58] Field of Search ................. 74/512, 516, 518, 529, 74/542

[56] References Cited

U.S. PATENT DOCUMENTS

| | | |
|---|---|---|
| 2,940,334 | 6/1960 | Koskela .................. 74/542 |
| 3,142,199 | 7/1964 | Burton et al. .......... 74/516 |
| 3,269,213 | 8/1966 | Buchwald ............... 74/516 |
| 3,487,716 | 1/1970 | Hirst, Jr. ................ 74/516 |
| 3,693,472 | 9/1972 | Hirst, Jr. et al. ....... 74/518 |
| 3,719,106 | 3/1973 | Schroter . | |
| 3,897,694 | 8/1975 | Hirst, Jr. ................ 74/518 |
| 3,938,407 | 2/1976 | Nisbet . | |
| 4,127,042 | 11/1978 | Lipshield ................ 74/529 |

FOREIGN PATENT DOCUMENTS

| | | |
|---|---|---|
| 1075349 | 7/1967 | United Kingdom . |
| 1081010 | 8/1967 | United Kingdom . |
| 1427447 | 3/1976 | United Kingdom . |
| 1443270 | 7/1976 | United Kingdom . |
| 1454002 | 10/1976 | United Kingdom . |

Primary Examiner—Kenneth Dorner
Attorney, Agent, or Firm—Laubscher & Laubscher

[57] ABSTRACT

A parking brake operating mechanism is disclosed which includes a ratchet link and an operating lever pivotally connected with a bracket housing so as to effect a mechanical advantage when displacing the brake cable operating pin in the brake-engaged direction. The ratchet link is pivotally connected intermediate its ends with the housing by a first pivot axis, and the operating lever is pivotally connected intermediate its ends with one end of the ratchet link by a second pivot axis, one end of the operating lever being connected with the pin that operates the parking brake cable. The first and second pivot axes are arranged generally on opposite sides of the brake cable pin, the distance between said axes being greater than the distance between the pin axis and the first axis, thereby to effect the desired mechanical advantage. A pawl cooperates with ratchet teeth on the ratchet link to normally prevent pivotal movement thereof in the brake-released direction.

7 Claims, 6 Drawing Figures

BRAKE CABLE OPERATING MEANS AFFORDING A MECHANICAL ADVANTAGE

BRIEF DESCRIPTION OF THE PRIOR ART

Foot-lever operated parking brake cable operating devices are well known in the patented prior art, as evidenced, for example, by the patents to Hirst U.S. Pat. Nos. 3,487,716 and 3,897,694, and Hirst et al U.S. Pat. No. 3,693,472, among others.

Various attempts have been made to increase the mechanical advantage of the force applied to the brake cable by the pivotally displaceable operating lever. Thus, in the Hirst U.S. Pat. No. 3,487,716, use is made of a pair of specially designed elliptical gears which are operable to initially apply a low mechanical advantage ratio to the cable actuator to rapidly take up cable slack and stretch, and subsequently to exhibit a high mechanical advantage ratio to achieve high brake cable stress during final travel of the brake pedal. A similar operation is achieved by the parking brake operating means of the Hirst et al U.S. Pat. No. 3,693,472, wherein specially designed cam means are provided including a pair of angularly arranged cam surfaces that are successively engaged by an actuating pin during pivotal operation of the cam means in the brake engaging direction.

While the prior proposals for obtaining a mechanical advantage are of interest, they were relatively complex and expensive to produce on a large scale basis.

SUMMARY OF THE INVENTION

Accordingly, a primary object of the present invention is to provide an improved parking brake cable operating mechanism including a pin the ends of which are guided in aligned slots contained in the bracket housing, side walls, a ratchet link pivotally connected intermediate its ends with the housing by a first pivot axis, and an operating lever the central portion of which is pivotally connected with one end of the ratchet link by a second pivot axis, one end of the operating lever being connected with the brake cable pin. The first and second pivot axes are arranged on opposite sides of the brake cable pin, the distance between said axes being greater than that between the pin axis and the first pivot axis, whereby upon pivotal displacement of the operating lever in the brake engaged direction, a mechanical advantage is imparted to the brake cable pin by the movement of the second pivot axis relative to the housing.

In accordance with a more specific object of the invention, pawl and ratchet means are provided for resisting pivotal movement of the ratchet link in the brake-released direction. Pawl release means are further provided for disengaging the pawl means from the ratchet teeth.

According to a further object, resilient abutment means are mounted between the ratchet link and the operating lever for limiting the extent of pivotal movement of the operating lever about the second pivot axis in the brake-released direction relative to the ratchet link.

The brake cable operating means of the present invention are of the variable ratio increasing mechanical advantage type including ratchet and pawl locking and releasing means, wherein a foot pedal pivotally connected to a pendular ratchet link is adapted for attachment to a cable assembly fitting or similar linkage by means of a pin the ends of which are slidably contained in a pair of aligned slots in suitable mounting plates, respectively. The movement of the pin through the aligned slots controls the movement of the pedal, which pivots the ratchet link and moves its teeth past the pawl, which maintains the pedal and ratchet link in the applied positions. A release arm is provided for displacing the pawl from its locked engagement with the ratchet link thereby allowing the ratchet link and pedal to return to the released position. The ratchet link, pawl and release arm are pivotally connected with the mounting plates. The pawl and release arm are spring-biased so as to maintain locking engagement between the pawl and the ratchet link and to maintain the release arm in its retracted idle position.

Still another object of the invention is to provide a foot-operated control mechanism that is simple to fabricate, easy to assemble, economical to market, and readily adapted to a variety of applications.

BRIEF DESCRIPTION OF THE DRAWING

Other objects and advantages of the invention will become apparent from a study of the following specification, when viewed in the light of the accompanying drawing, in which.

DETAILED DESCRIPTION

Figure 1:
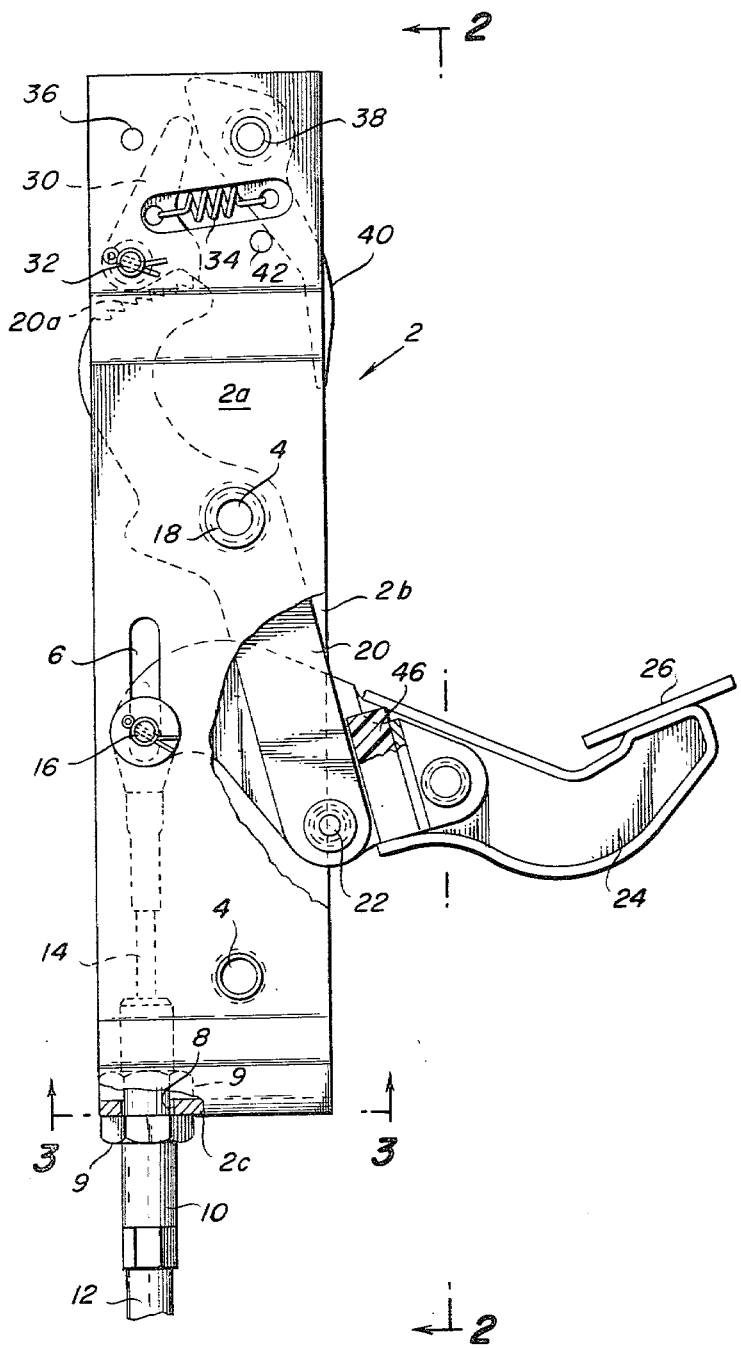
FIG. 1 is a partly broken away side elevational view of the brake cable operating mechanism of the present invention, when in the brake-released condition.
Figure 2:
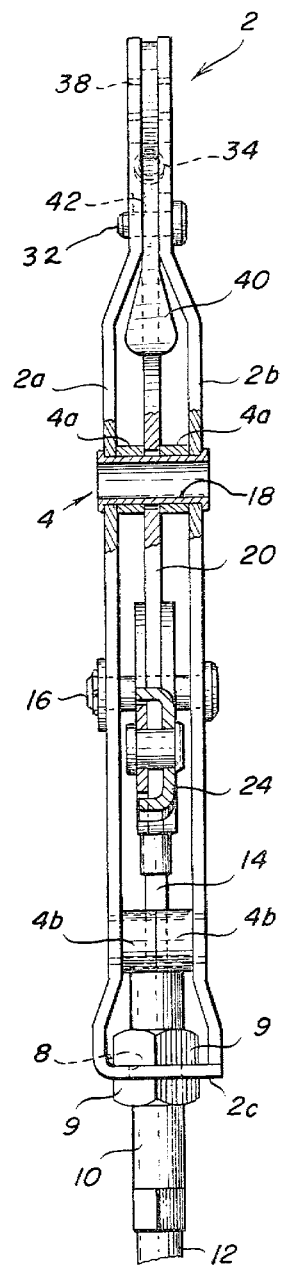
FIGS. 2 and 3 are sectional views taken along lines 2—2 and 3—3, respectively, of FIG. 1.
Figure 3:
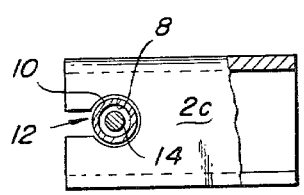

Referring first more particularly to FIGS. 1-3, the improved parking brake cable operating means of the present invention include a bracket housing 2 containing openings 4 for receiving bolts by means of which the housing may be fastened to the chassis of a motor vehicle or the like. The bracket housing 2 includes a pair of parallel spaced side walls 2a and 2b that contain a pair of aligned slots 6 that extend longitudinally of the bracket. At its lower end, the bracket housing includes a transverse wall portion 2c that contains an opening 8 in which is secured by nuts 9 the outer member 10 of the coaxial parking brake cable assembly 12. The inner brake cable 14 is connected with the brake cable pin 16 that extends transversely of the housing 2 with the ends of the pin being slidably received in guided relation within the slots 6, respectively.

Pivotally connected intermediate its ends with the bracket housing 2 by first pivot means 18 is a ratchet link 20. Pivotally connected intermediate its ends by second pivot means 22 to the lower end of ratchet link 20 is a foot-pedal operating lever 24. One end of the operating lever 24 is connected with the brake cable pin 16, and the other end of the operating lever carries the foot pedal pad 26.

At its upper end, the ratchet link 20 is provided with ratchet teeth 20a that are arranged for cooperation with a pawl member 30 that is pivotally connected with the bracket housing 2 for pivotal movement about a third pivot axis 32. Tension spring 34 normally biases pawl 30 in the clockwise direction about the third pivot axis 32 toward engagement with the ratchet teeth 20a, the extent of pivotal movement of pawl 30 in the counter-clockwise direction being limited by the fixed stop 36 on the bracket housing 2. Pivotally connected with the bracket housing 2 for pivotal movement about the fourth pivot axis 38 is a pawl release member 40. This pawl release member 40 is normally biased by spring 34 in the clockwise direction toward engagement with the fixed stop 42 provided on the bracket housing 2, as shown in FIG. 1.

As shown in FIG. 1, a resilient bumper member 46 is mounted on the transverse wall on the operating lever 24 for limiting the extent of pivotal movement of the operating lever in the counter-clockwise direction about the second pivot axis 22 relative to the ratchet link 20.

As shown in FIG. 2, the tubular spacer elements 4a associated with the bracket openings 4 serve to space the bracket side walls 2a and 2b from each other. The first pivot means 18 about which the ratchet link 20 pivots comprises a tubular member that is inserted axially through the aligned bores of the spacer members 4a that are arranged on opposite sides of the ratchet link 20. At the lower end of the bracket housing, the tubular spacer 4b is arranged between the housing side walls 2a and 2b in alignment with the housing opening 4.

OPERATION

Figure 4:
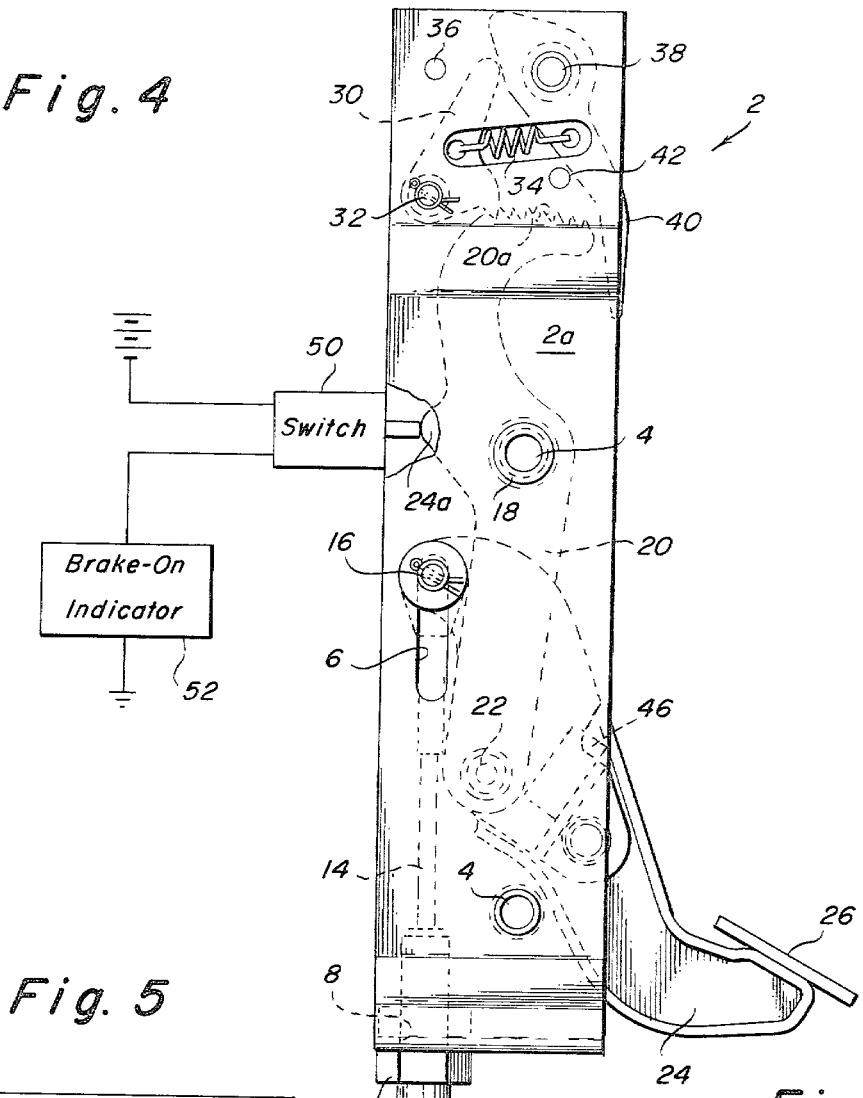
FIG. 4 is a side elevational view of the apparatus of FIG. 1 when in the brake-engaged condition.

In operation, assume that the parking brake cable operating mechanism is in the brake-released condition of FIG. 1. When the operator depresses the parking brake pedal 26, operating lever 24 is pivoted in the clockwise direction about the second pivot means 22, and the ratchet link 20 is pivoted in the clockwise direction about the first pivot 18, whereupon brake cable pin 16 is displaced upwardly within the guide slots 6, and tension is applied to the inner brake cable 14. The ratchet teeth 20a are progressively displaced in locking engagement with the pawl 30 during pivotal movement of the ratchet link 20 in the clockwise direction, thereby preventing counter-clockwise movement of the ratchet link about the first pivot axis 18. As the operating lever 24 is progressively displaced in the clockwise direction toward the brake-engaged position of FIG. 4, the simultaneous pivotal movement of the ratchet link 20 causes the second pivot axis 22 to be displaced inwardly toward the plane containing the center axes of the guide slot 6, thereby effecting an increased mechanical advantage for applying tension to the inner brake cable 14 as the brake cable pin 16 reaches its upper limit of travel as shown in FIG. 4. When the operating lever 24 is in the brake-engaged position, a projection 24a thereon engages the contact of switch means 50 thereby to energize the brake-on indicating means 52.

Figure 5:
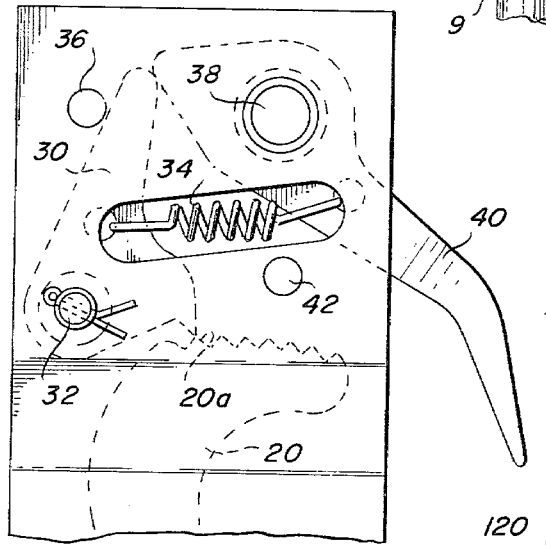
FIG. 5 is a detailed view indicating the operation of the pawl release means of FIG. 4 to the pawl-released position.

To release the parking brake operating mechanism when in the brake-engaged condition of FIG. 4, pawl release member 40 is pivoted upwardly about the pivot axis 38 as shown in FIG. 5, whereupon pawl 30 is pivoted in the counter-clockwise direction about its pivot axis 32, thereby to raise the pawl projection from the ratchet teeth 20a, whereupon the tension in the inner brake cable 14 causes brake cable pin 16 to be displaced downwardly in guide slots 6, and the operating lever and ratchet link 20 to be pivoted in the counter-clockwise directions toward their initial FIG. 1 positions.

Figure 6:
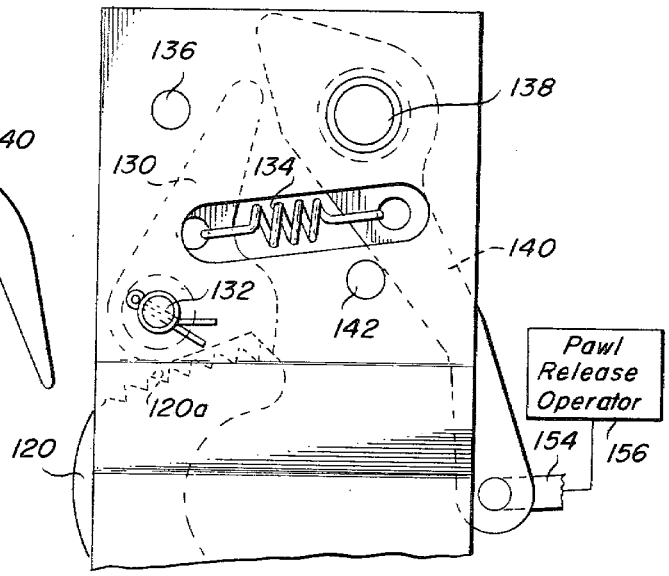
FIG. 6 is a detailed view of another embodiment of the pawl release means.

In the modification of FIG. 6, instead of a manually operable pawl release member, the pawl release member 140 may be pivoted in the counter-clockwise direction by operating rod 154 and pawl-release operating means 156, thereby to lift the pawl out of engagement with the ratchet teeth 120a of the ratchet link 120.

While in accordance with the provisions of the Patent Statutes, the preferred forms and embodiments of the invention have been illustrated and described, it will be apparent that various changes and modifications may be made without deviating from the inventive concepts set forth above.

What is claimed is:

1. Apparatus for axially displacing an inner cable member (14) of a parking brake assembly (12) relative to a coaxially arranged outer cable member (10), comprising
   (a) a housing (2) including a pair of opposed parallel spaced side walls (2a, 2b) containing opposed generally longitudinally extending guide slots (6), respectively, said housing being adapted for connection at one end with said outer cable member;
   (b) a brake cable pin (16) extending between, and generally normal to, said side walls, said brake cable pin having end portions extending within said guide slots, respectively, said pin being adapted for connection with one end of the inner cable member;
   (c) means for laterally displacing said brake cable pin in parallel relation in a direction longitudinally of said guide slots from an initial brake-released position toward a brake-engaged position, including
      (1) a ratchet link (20) pivotally connected intermediate its ends with said housing for movement about a fixed first pivot axis (18);
      (2) an operating lever (24) pivotally connected intermediate its ends with one end of said ratchet link for pivotal movement about a second pivot axis (22), said operating lever being connected at one end with said brake cable pin, said first and second pivot axes being parallel with, and arranged generally on opposite sides of, the axis of said brake cable pin, respectively, whereby the distance between the first and second pivot axes is greater than the distance between the brake cable pin axis and the first pivot axis; and
      (3) pawl and ratchet means (30, 20a) associated with the other end of said ratchet link for normally preventing pivotal movement of said ratchet link toward the brake-released position, whereby during pivotal movement of said operating lever about the second pivot axis toward the brake-engaged position the second pivot axis is displaced by the simultaneous pivotal movement of said ratchet link to increase the mechanical advantage applied to said brake cable pin by said operating lever.

2. Apparatus as defined in claim 1, wherein said pawl and ratchet means comprises a plurality of ratchet teeth carried by the other end of said ratchet link, and a pawl member pivotally connected within one end of said housing adjacent said ratchet teeth for movement about a third pivot axis parallel with the first and second pivot axes.

3. Apparatus as defined in claim 2, and further including resilient abutment means mounted between said ratchet link and said operating lever for limiting the extent of pivotal movement of said operating lever about the second pivot axis in the brake-released direction relative to said ratchet link.

4. Apparatus as defined in claim 2, and further including pawl release means for releasing the pawl member from the ratchet teeth.

5. Apparatus as defined in claim 4, wherein said pawl release means includes a pawl release lever pivotally connected with said housing adjacent said pawl, and spring means normally biasing said pawl release lever toward an inoperative position relative to said pawl.

6. Apparatus as defined in claim 5, and further including remote control rod means connected with said pawl release lever for pivoting the same in the pawl-releasing direction relative to said pawl.

7. Apparatus as defined in claim 2, wherein said ratchet link includes at least one lobe projection for operating indicating switch means when said ratchet link is in the brake-engaged position.

* * * * *